United States Patent
Keller et al.

(10) Patent No.: US 6,579,510 B2
(45) Date of Patent: *Jun. 17, 2003

(54) SPOX-ENHANCED PROCESS FOR PRODUCTION OF SYNTHESIS GAS

(76) Inventors: Alfred E. Keller, 1000 S. Pine St. RW, Ponca City, OK (US) 74602-1267; Joe D. Allison, 1000 S. Pine St. RW, Ponca City, OK (US) 74602-1267; Sriram Ramani, 1000 S. Pine St. RW, Ponca City, OK (US) 74602-1267

(*) Notice: Subject to any disclaimer, the term of this patent is extended or adjusted under 35 U.S.C. 154(b) by 0 days.

This patent is subject to a terminal disclaimer.

(21) Appl. No.: 09/742,999

(22) Filed: Dec. 20, 2000

(65) Prior Publication Data

US 2002/0110521 A1 Aug. 15, 2002

Related U.S. Application Data

(63) Continuation-in-part of application No. 09/625,710, filed on Jul. 25, 2000.
(60) Provisional application No. 60/146,635, filed on Jul. 30, 1999.

(51) Int. Cl.$^7$ ............................. C01B 17/04; C01B 3/02
(52) U.S. Cl. ............................... 423/573.1; 423/245.1; 423/418.2; 423/576.2; 423/576.8; 423/648.1; 423/650; 423/651; 252/373
(58) Field of Search .............................. 423/245.1, 418.2, 423/573.1, 576.2, 576.8, 651, 648.1, 650; 252/373

(56) References Cited

U.S. PATENT DOCUMENTS

| | | | |
|---|---|---|---|
| 2,963,348 A | 6/1957 | Sellers | 23/225 |
| 4,038,036 A | 7/1977 | Beavon | 23/262 |
| 4,279,882 A | 7/1981 | Beavon | 423/574 |
| 4,311,683 A | 1/1982 | Hass et al. | 423/573 |
| 4,406,873 A | 9/1983 | Beavon | 423/574 |
| 4,481,181 A | 11/1984 | Norman | 423/573 |
| 4,797,268 A | 1/1989 | McGovern et al. | 423/574 R |
| 4,863,707 A | * 9/1989 | McShea, III et al. | 423/359 |
| 4,877,550 A | * 10/1989 | Goetsch et al. | 252/373 |
| 4,886,649 A | 12/1989 | Ismagilov et al. | 423/230 |
| 4,889,701 A | 12/1989 | Jones et al. | 423/220 |
| 4,891,187 A | 1/1990 | Jungfer et al. | 423/248 |
| 4,988,494 A | 1/1991 | Lagas et al. | 423/574 |
| 5,232,467 A | 8/1993 | Child et al. | 48/127.3 |
| 5,397,556 A | 3/1995 | Towler et al. | 423/220 |
| 5,472,920 A | 12/1995 | Dubois et al. | 501/103 |
| 5,512,260 A | 4/1996 | Kiliany et al. | 423/242.1 |
| 5,597,546 A | 1/1997 | Li et al. | 423/573.1 |
| 5,603,913 A | 2/1997 | Alkhazov et al. | 423/576.8 |
| 5,639,929 A | 6/1997 | Bharadwaj et al. | 585/658 |

(List continued on next page.)

FOREIGN PATENT DOCUMENTS

| | | | |
|---|---|---|---|
| FR | 2702675 A1 | 3/1993 | B01D/53/36 |
| RU | 2023655 C1 | 11/1994 | |

OTHER PUBLICATIONS

M.E.D. Raymont, *Role of hydrogen in Claus plants*, Hydrocarbon Processing, 177–179 (May 1975).
Richard K. Kerr, et al, *A new sulfur–recovery process: The RSRP*, Oil & Gas Journal 230–243 (Jul. 26, 1982).
M.E.D. Raymont, *Make hydrogen from hydrogen sulfide*, Hydrocarbon Processing, 139–142 (Jul. 1975).

(List continued on next page.)

*Primary Examiner*—Stanley S. Silverman
*Assistant Examiner*—Timothy C. Vanoy
(74) *Attorney, Agent, or Firm*—Conley, Rose & Tayon, PC

(57) ABSTRACT

A method, system and catalysts for improving the yield of syngas from the catalytic partial oxidation of methane or other light hydrocarbons is disclosed. The increase in yield and selectivity for CO and $H_2$ products results at least in part from the substitution of $H_2S$ partial oxidation to elemental sulfur and water for the combustion of light hydrocarbon to $CO_2$ and water.

20 Claims, 2 Drawing Sheets

U.S. PATENT DOCUMENTS

| | | | |
|---|---|---|---|
| 5,653,953 A | 8/1997 | Li et al. | 423/576.8 |
| 5,654,491 A | 8/1997 | Goetsch et al. | 568/469.9 |
| 5,676,921 A | 10/1997 | Heisel et al. | 423/573.1 |
| 5,700,440 A | 12/1997 | Li et al. | 423/230 |
| 5,720,901 A | 2/1998 | De Jong et al. | 252/373 |
| 5,807,410 A | 9/1998 | Borsboom et al. | 23/293 |
| 5,814,293 A | 9/1998 | Terorde et al. | 423/576 |
| 5,891,415 A | 4/1999 | Alkhazov et al. | 423/573.1 |
| 5,897,850 A | 4/1999 | Borsboom et al. | 423/576.2 |
| 5,965,100 A | 10/1999 | Khanmamedov | 423/576.8 |
| 6,017,507 A | 1/2000 | Nougayrede et al. | 423/573.1 |
| 6,083,471 A | 7/2000 | Philippe et al. | 423/573.1 |
| 6,099,819 A | 8/2000 | Srinivas et al. | 423/573.1 |
| 6,103,206 A | 8/2000 | Taylor, Jr. et al. | 423/210 |
| 6,103,773 A | 8/2000 | Wittenbrink et al. | 518/702 |
| 6,403,051 B1 * | 6/2002 | Keller | 423/573.1 |
| 6,409,940 B1 * | 6/2002 | Gaffney et al. | 252/373 |
| 2002/0119091 A1 * | 8/2002 | Keller | 423/576.8 |

OTHER PUBLICATIONS

R.H. Hass, et al, *Process meets sulfur recovery needs*, Hydrocarbon Processing 104–107 (May 1981).

J.A. Lagas, et al, *Selective–oxidation catalyst improves Claus process*, Oil & Gas Journal, 68–71 (Oct. 10, 1988).

Z.R. Ismagilov, et al, *New Catalysts and Processes For Environment Protection*, React. Kinet. Catal. Lett., vol. 55, No. 2, 489–499 (1995).

Kuo–Tseng Li and Ni–Shen Shyu, *Catalytic Oxidation of Hydrogen Sulfide to Sulfur on Vanadium Antimonate*, Ind. Eng. Chem. Res. 1480–1484 (1997) vol. 36 No. 5.

J. B. Hyne, *Methods for desulfurization of effluent gas streams*, The Oil & Gas Journal, 64–78 (Aug. 28, 1972).

B. Gene Goar, *Today's Sulfur Recovery Processes*, Hydrocarbon Processing vol. 47, No. 9, 248–252 (Sep. 1968).

R. Gene Goar, *First Recycle Selectox unit onstream,* Oil & Gas Journal, 124–125 (Apr. 26, 1982).

Sung Woo Chun, et al, *Selective oxidation of H2S to elemental sulfur over $TiO_2/SiO_2$ catalysts*, Applied Catalysis B: Environmental 16, 235–243 (1998).

J. Chao, *Properties of Elemental Sulfur,* Hydrocarbon Processing, 217–223, (Nov. 1980).

David M. Haaland, *Nancatalytic Electrodes for Solid–Electrolyte Oxygen Sensors*, J. Electrochem. Soc.: Electrochemical Science and Technology, vol. 127, No. 4, 796–804 (1980).

PCT Search Report in PCT/US00/40489 International Filing Date: Jul. 26, 2000.

PCT Search Report in PCT/US00/20252 International Filing Date: Jul. 26, 2000.

H. Austin Taylor and Charles F. Pickett, *The Decomposition of Hydrogen Sulphide*, Journal of Physical Chemisty, vol. 31, pp. 1212–1219 (1927).

J. W. Mellor, *A Comprehensive Treatise on Inorganic and Theoretical Chemistry*, vol. X, Longmans, Green and Co., New York, 118–119, 128–129, 206–213, 221–223, 144–148, 152–159, 162–166,393–400 (1947).

PCT Search Report in PCT/US00/34692 dated Jul. 31, 2002.
PCT Search Report in PCT/US01/48792 dated Jul. 8, 2002.

* cited by examiner

SPOX-ENHANCED PROCESS FOR PRODUCTION OF SYNTHESIS GAS

CROSS-REFERENCE TO RELATED APPLICATIONS

This application is a continuation-in-part of U.S. application Ser. No. 09/625,710 filed Jul. 25, 2000, which claims the benefit of U.S. Provisional Application No. 60/146,635 filed Jul. 30, 1999.

BACKGROUND OF THE INVENTION

1. Field of the Invention

The present invention generally relates to processes for producing synthesis gas from light hydrocarbons employing a short contact time reactor. More particularly, the invention pertains to methods of increasing the yield of syngas in processes employing partial oxidation of methane or natural gas to products containing CO and $H_2$ by concurrent catalytic partial oxidation of $H_2S$ to elemental sulfur and hydrogen.

2. Description of Related Art

Many refineries face an abundant supply of lower alkanes, i.e., $C_1$–$C_4$ alkanes such as methane, and relatively few means of converting them to more valuable products. Moreover, vast reserves of methane, the main component of natural gas, are available in many areas of the world, and natural gas is predicted to outlast oil reserves by a significant margin. There is great incentive to exploit these natural gas formations, however most natural gas formations are situated in areas that are geographically remote from population and industrial centers. The costs of compression, transportation, and storage make its use economically unattractive. To improve the economics of natural gas use, much research has focused on methane as a starting material for the production of higher hydrocarbons and hydrocarbon liquids, which are more easily transported than syngas.

The conversion of methane to higher hydrocarbons is typically carried out in two steps. In the first step, methane is reformed with water to produce a mixture of carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Syngas generation from methane typically takes place by one of three techniques. Steam reforming of methane is the most common, followed by partial oxidation, and autothermal reforming.

The partial oxidation of methane can be represented by the reaction shown in equation (1):

(1)

At the same time, some of the methane burns completely, according to equation (2):

(2)

Hence, syngas is typically a mixture of carbon monoxide and molecular hydrogen, generally having a hydrogen to carbon monoxide molar ratio in the range of 1:5 to 5:1, and may contain other gases such as carbon dioxide. Synthesis gas is not usually considered a commodity; instead, it is typically generated on-site for further processing. Synthesis gas is commonly used as a feedstock for conversion to alcohols (e.g., methanol), olefins, or saturated hydrocarbons (paraffins) according to the well-known Fischer-Tropsch process, and by other means. The resulting high molecular weight (e.g. $C_{50+}$) paraffins, in turn, provide an ideal feedstock for hydrocracking, a feedstock for conversion to high quality jet fuel, and superior high octane value diesel fuel blending components.

Emerging technologies that have been developed to generate syngas from methane include a technique that entails exposing a mixture of methane and oxygen to a hot catalyst for a brief time, typically on the order of milliseconds, followed by cooling of the resultant gas stream. EPO Patent No. 303,438 describes a process for synthesis gas production by catalytic partial oxidation to overcome some of the disadvantages and costs of steam reforming. A monolith catalyst is used with or without metal addition to the surface of the monolith and the process operates at space velocities of 20,000–500,000 $hr^{-1}$. Conventional catalytic partial oxidation processes are also described, for example, in U.S. Pat. Nos. 5,654,491, 5,639,929, 5,648,582 and in *J. Catalysis* 138, 267–282 (1992), the disclosures of which are incorporated herein by reference. Although in conventional short contact time syngas generation systems the syngas reaction can be self-sustaining once initiated, it has been shown that 10–15% of the carbon initially present as methane can be lost to the formation of $CO_2$ in combustion via equation (2), above. This directly reduces the yield of syngas that can be obtained. Therefore it is desirable to use a syngas generation system that allows a better yield of carbon monoxide and hydrogen.

Further complicating the exploitation of the world's natural gas supply is the fact that many natural gas formations contain $H_2S$ in concentrations ranging from trace amounts up to about 3–25% (by volume) hydrogen sulfide. For example, many of the catalysts that are conventionally used for the production of synthesis gas are poisoned by the presence of sulfur.

If the hydrocarbon conversion does proceed to some degree, the syngas product is typically contaminated by passed through $H_2S$ and/or $SO_2$. The presence of $H_2S$ or $SO_2$ generally diminishes the usefulness of the syngas or creates environmental safety concerns. It would be highly desirable in the natural gas exploitation industry to find a way to efficiently convert the light hydrocarbon content of the natural gas to synthesis gas without conducting an initial sulfur removal operation. In a related aspect of petroleum refining, some petroleum feed streams and separated fractions contain sulfur. Sulfur is typically undesirable in most petroleum refining processes and products. Refineries typically upgrade the quality of the various petroleum fractions by removing the sulfur before they are processed further. Hydrodesulfurization units are used to break down the sulfur compounds in the petroleum fractions and convert the sulfur to $H_2S$. In addition to hydrodesulfurization processes, other conversion processes in a typical refinery, such as fluid catalytic cracking, coking, visbreaking, and thermal cracking, produce $H_2S$ from sulfur containing petroleum fractions. The $H_2S$ from both the desulfurization processes and these conversion processes is typically removed from the gas streams or light liquid hydrocarbon streams using either chemical solvents based on alkanolamine chemistry or physical solvents. A circulating, regenerative $H_2S$ removal system employing an absorption stage for $H_2S$ pickup and a regeneration stage for $H_2S$ rejection produces a concentrated stream of $H_2S$.

In conventional systems, this $H_2S$ stream is then fed to a $H_2S$ conversion unit, which converts the $H_2S$ into a storable, saleable product such as elemental sulfur, sodium hydrosulfide solution, or sulfuric acid. Conversion of the $H_2S$ to elemental sulfur is most common, mainly because elemental sulfur is the most marketable sulfur compound of those typically produced.

The process most commonly used to recover elemental sulfur from H$_2$S gas is the modified Claus sulfur recovery process. The conventional Claus process is well known in the art, and is also described in U.S. Pat. application Ser. No. 09/624,715, the disclosure of which is incorporated herein by reference.

U.S. Pat. No. 5,720,901 describes a process for the catalytic partial oxidation of hydrocarbons in which nitrogen is present in the hydrocarbon feed mixture. An organic or inorganic sulfur-containing compound is present in the feed mixture in a sufficient concentration (i.e., 0.05 to 100 ppm) to reduce the presence of nitrogen by-products, particularly ammonia and hydrogen cyanide, in the products of the catalytic partial oxidation process. Hydrocarbon feedstocks used directly from naturally occurring reservoirs in which the sulfur content is significantly above the aforementioned limits may be subjected to a partial sulfur removal treatment before being employed in that process. A sulfur removal step is applied to the product stream if the carbon monoxide and/or hydrogen products of the process are to be utilized in applications that are sensitive to the presence of sulfur, such as Fischer-Tropsch synthesis.

It would be desirable to have a syngas production process than can avoid the need for an initial sulfur-removal step from H$_2$S-containing natural gas sources. It would also be desirable to have a syngas production process with improved yield and selectivity for CO and H$_2$ products compared to conventional syngas processes. Also needed are new and better ways to utilize H$_2$S gas streams arising from existing desulfurization processes.

SUMMARY OF THE INVENTION

The present invention provides a method, system and catalysts that improve the yield of syngas generation and selectivity for CO and H$_2$ products, at least in part by substituting H$_2$S partial oxidation for methane combustion in a syngas reactor. The partial oxidation of H$_2$S provides the heat necessary to sustain the syngas reaction at the desired temperature without consuming the methane or other light hydrocarbon. Hence, less methane is lost to complete combustion and yield of the product is increased. In accordance with certain embodiments of the invention, a process for producing synthesis gas is provided. The process comprises, contacting an H$_2$S-containing light hydrocarbon stream, in the presence of O$_2$, with a catalyst having activity for catalyzing the partial oxidation of the hydrocarbon to a product comprising CO and H$_2$ and also having activity for catalyzing the partial oxidation of H$_2$S to elemental sulfur and water, under reaction promoting conditions of temperature, flow rate, molar ratios of reactant gases, and reactant gas/catalyst contact time. The process also includes maintaining the reaction promoting conditions such that the reactions

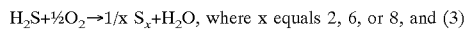

$H_2S + \frac{1}{2}O_2 \rightarrow 1/x\ S_x + H_2O$, where x equals 2, 6, or 8, and (3)

$CH_4 + \frac{1}{2}O_2 \rightarrow CO + 2H_2$     (1)

simultaneously occur and a process gas stream is obtained comprising CO, H$_2$, gaseous elemental sulfur and steam. The process further comprises condensing elemental sulfur from the process gas stream to provide a substantially desulfurized synthesis gas stream. In preferred embodiments the process includes contacting the catalyst with a portion of the H$_2$S-containing light hydrocarbon stream for no more than about 10 milliseconds.

In some embodiments, a process for producing synthesis gas is provided that comprises providing a first gas stream containing a C$_1$–C$_4$ alkane, or mixture thereof, and, optionally, H$_2$S. Optionally, a second gas stream containing H$_2$S mixed with the first gas stream, such that a H$_2$S-containing hydrocarbon feed gas stream is produced having a H$_2$S:CH$_4$ molar ratio of about 1:10 to about 2:3. The process includes mixing the H$_2$S-containing hydrocarbon feed gas stream with an O$_2$-containing stream to form a reactant gas stream, the reactant gas stream having a CH$_4$:O$_2$ molar ratio of about 1.5:1 to about 2.2:1. The process also includes passing the reactant gas stream over a catalyst such that a portion of the reactant gas contacts the catalyst for no more than about 10 milliseconds. The selected catalyst is capable of catalyzing the partial oxidation of to CO and H$_2$ and also capable of catalyzing the partial oxidation of H$_2$S to elemental sulfur and water under reaction promoting conditions. The process further includes maintaining reaction-promoting conditions of temperature, molar ratios of reactant gas components, and flow rate such that a gaseous product stream comprising CO, H$_2$, 1/x S$_x$ and H$_2$O is obtained, wherein X=2, 6, or 8. The gaseous product stream is then cooled to the condensation temperature of elemental sulfur, or lower, such that elemental sulfur condenses from the product stream and an at least partially desulfurized gaseous product stream is obtained. Optionally, elemental sulfur product is recovered. Any residual gaseous sulfur-containing components may, optionally, be removed from the at least partially desulfurized gaseous product stream using, for example, a sulfur absorbing sulfur absorbing material such as zinc or iron oxide. Substantially sulfur-free synthesis gas, preferably in high yield, having a H$_2$:CO molar ratio of about 2:1 and containing less than about 10 vol. % CO$_2$ is recovered from said product stream.

Also provided according to certain embodiments of the invention is a method for improving the yield of a syngas generation system, comprising providing a first gas stream containing a light hydrocarbon, mixing a second gas stream containing H$_2$S with the first gas stream to form a feed gas stream, mixing the feed gas stream with an oxygen containing stream to form a mixed feed stream, contacting the mixed feed stream with a hot catalyst to form a product stream, and removing syngas and elemental sulfur from the product stream. In certain embodiments, the method further comprises removing residual H$_2$S from the product stream.

According to some embodiments the step of mixing a second gas stream comprising H$_2$S with the first gas stream to form a feed gas stream is carried out at temperatures up to about 300° C. In some embodiments the step of contacting the feed gas stream with a hot catalyst to form a product stream is carried out at temperatures above 500° C., preferably between about 850 and 1,500° C.

In some embodiments the method of improving syngas yield includes converting less than 10 vol. % of the light hydrocarbon to carbon dioxide. In preferred embodiments the catalyst contact time is less than 10 milliseconds.

According to some embodiments, the method employs a catalyst is selected from the group consisting of: platinum, rhodium, iridium, nickel, palladium, iron, cobalt rhenium rubidium, Pd—La$_2$O$_3$, Pt/ZrO$_2$, Pt/Al$_2$O$_3$ and combinations thereof.

Another aspect of the present invention provides a system for the partial oxidation of light hydrocarbons, comprising a hydrocarbon injection line, an H$_2$S injection line in communication with said hydrocarbon injection line, an oxygen injection line in communication with said hydrocarbon injection line, a reaction zone receiving gases from said hydrocarbon, H$_2$S and oxygen injection lines and including a catalyst suitable for catalyzing said hydrocarbon to form CO and H$_2$. In some embodiments the system includes a mixing zone upstream of the reaction zone, the mixing zone receiving gases from the hydrocarbon and the H$_2$S lines, wherein the temperature of the mixing zone is up to about 300° C. In certain embodiments the system comprises a thermal barrier between the mixing zone and the reaction zone. In certain embodiments the oxygen injection line communicates with the reaction zone, and in some embodiments the mixing zone receives oxygen from said oxygen injection line. According to some embodiments the temperature of the reaction zone is between about 850–1,500° C. Preferably the system includes at least one cooling zone downstream of the reaction zone, and at least one tailgas processing unit downstream of the final cooling zone. In some embodiments the catalyst is supported on wire gauze and comprises platinum, rhodium, iridium, nickel, palladium, iron, cobalt, rhenium, rubidium, Pd—La$_2$O$_3$, Pt/ZrO$_2$, Pt/Al$_2$O$_3$, or a combination thereof.

In yet another aspect of the present invention is provided a method for improving the yield of a syngas generation system. The method comprises providing a gas stream comprising a light hydrocarbon, mixing a second gas stream comprising H$_2$S with the first gas stream to form a feed gas stream, while maintaining the temperature of the feed gas stream below about 500° C., and preferably no more than about 300° C. The method also includes contacting the feed gas stream with a hot catalyst, in the presence of O$_2$, to form a product stream wherein less than 10% of the carbon atoms in the light hydrocarbon is converted to carbon dioxide, and the removing syngas and elemental sulfur from the product stream. In some embodiments the method comprises mixing O$_2$ with the light hydrocarbon prior to contacting the feed gas stream with a hot catalyst. In some embodiments the O$_2$ is mixed with the light hydrocarbon during the contacting of the feed gas stream with a hot catalyst.

Yet another aspect of the present invention provides a catalyst having activity for concurrently catalyzing the partial oxidation of a light hydrocarbon and for catalyzing the partial oxidation of H$_2$S to produce a product mixture comprising CO, H$_2$, 1/x S$_x$ and H$_2$O, wherein x=2, 6 or 8, under reaction promoting conditions of temperature, flow rate, molar ratios of reactant gases, and reactant gas/catalyst contact time up to about 10 milliseconds. Preferred catalyst compositions comprise platinum, rhodium, iridium, nickel, palladium, iron, cobalt, rhenium or rubidium, or a combination of any of those metals. Preferably, a lanthanide element or oxide thereof is also included. The catalyst may also be supported on a refractory support, having sufficient strength and transparency to permit high pressures and flow rates, and made of alumina, zirconia or partially stabilized (MgO) zirconia, for example. In some embodiments the catalyst comprises Pd—La$_2$O$_3$. In some embodiments the catalyst comprises Pt/ZrO$_2$ or Pt/Al$_2$O$_3$. In some embodiments the catalyst comprises about 87–93 wt % Pt and about 7–13 wt % Rh.

In certain preferred embodiments, the catalyst comprises rhodium and samarium on an alumina or partially stabilized (MgO) zirconia (PSZ) support. According to one such embodiment the catalyst is prepared by depositing about 4–6 wt % Rh onto a layer of about 5 wt % Sm coating a PSZ monolith. These and other embodiments, features and advantages of the present invention will become apparent with reference to the following drawings and description.

BRIEF DESCRIPTION OF THE DRAWINGS

For a more detailed description of the present invention, reference will now be made to the accompanying drawings, wherein.

DETAILED DESCRIPTION OF PREFERRED EMBODIMENTS

Several schemes for carrying out catalytic partial oxidation (CPOX) of hydrocarbons in a short contact time reactor have been described in the literature. For example, L. D. Schmidt and his colleagues at the University of Minnesota describe a millisecond contact time reactor in U.S. Pat. No. 5,648,582 and in *J. Catalysis* 138, 267–282 (1992) for use in the production of synthesis gas by direct oxidation of methane over a catalyst such as platinum or rhodium. A general description of major considerations involved in operating a reactor using millisecond contact times is given in U.S. Pat. No. 5,654,491. The disclosures of the above-mentioned references are incorporated herein by reference.

Syngas Production Assembly

The present inventors have developed an assembly and process for the enhanced production of synthesis gas. In the new syngas generation process the catalytic partial oxidization of H$_2$S ("SPOX") to elemental sulfur and water and the catalytic net partial oxidization (CPOX) of methane are carried out together in a short (<10 milliseconds) contact time reactor assembly. The SPOX and CPOX reactions are carried out concurrently in a syngas production assembly that employs a short contact time flow reactor that is capable of withstanding temperatures up to about 1,500° C. Without wishing to be bound by a particular theory, the inventor suggests that by substituting the heat of partial oxidation of H$_2$S for the combustion of methane, the new syngas production process provides the heat necessary to maintain the syngas reaction at the desired temperature without giving up the methane to combustion products. This, in turn, results in a higher overall yield for the process.

Figure 1:
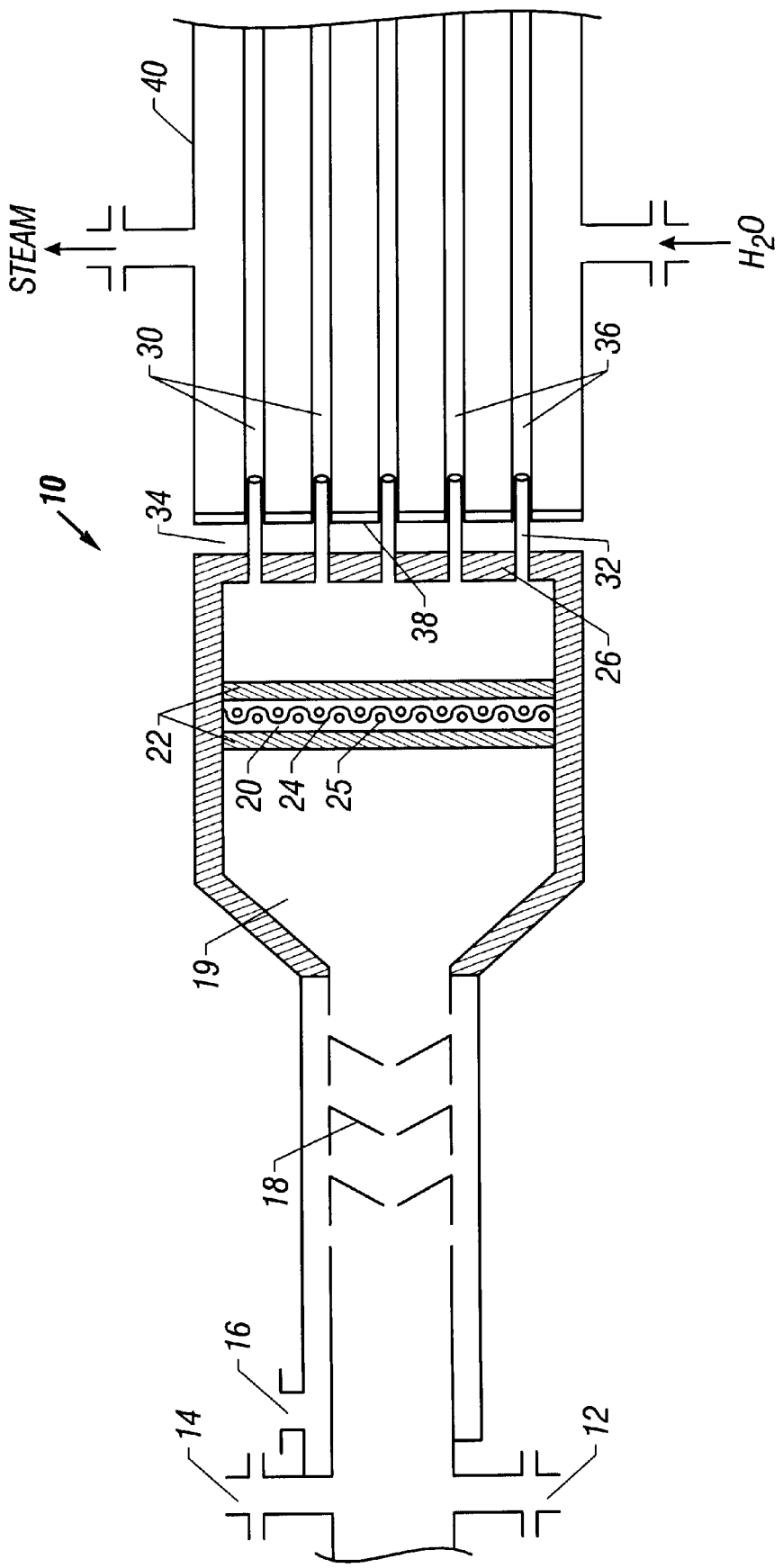
FIG. 1 is an enlarged cross-sectional view of a short contact time reactor and cooling zone constructed in accordance with a preferred embodiment of the present invention.

Referring initially to FIG. 1, reactor 10 of a preferred syngas production assembly is shown. Reactor 10 includes feed injection openings 12, 14, and 16, a mixing zone 19, a reaction zone 20 and a cooling zone 30. Reaction zone 20 preferably includes a thermal radiation barrier 22 positioned immediately upstream of a catalytic device 24 in a fixed-bed configuration. Radiation barrier 22 is preferably a porous ceramic or refractory material that is suited to withstand operating temperatures and provide sufficient thermal insulation, such as those described in U.S. Pat. No. 4,038,036 (Beavon), which is incorporated herein by reference. In commercial scale operations the reactor may be constructed of, or lined with, any suitable refractory material that is capable of withstanding the temperatures generated by the exothermic CPOX and SPOX reactions.

Figure 2:
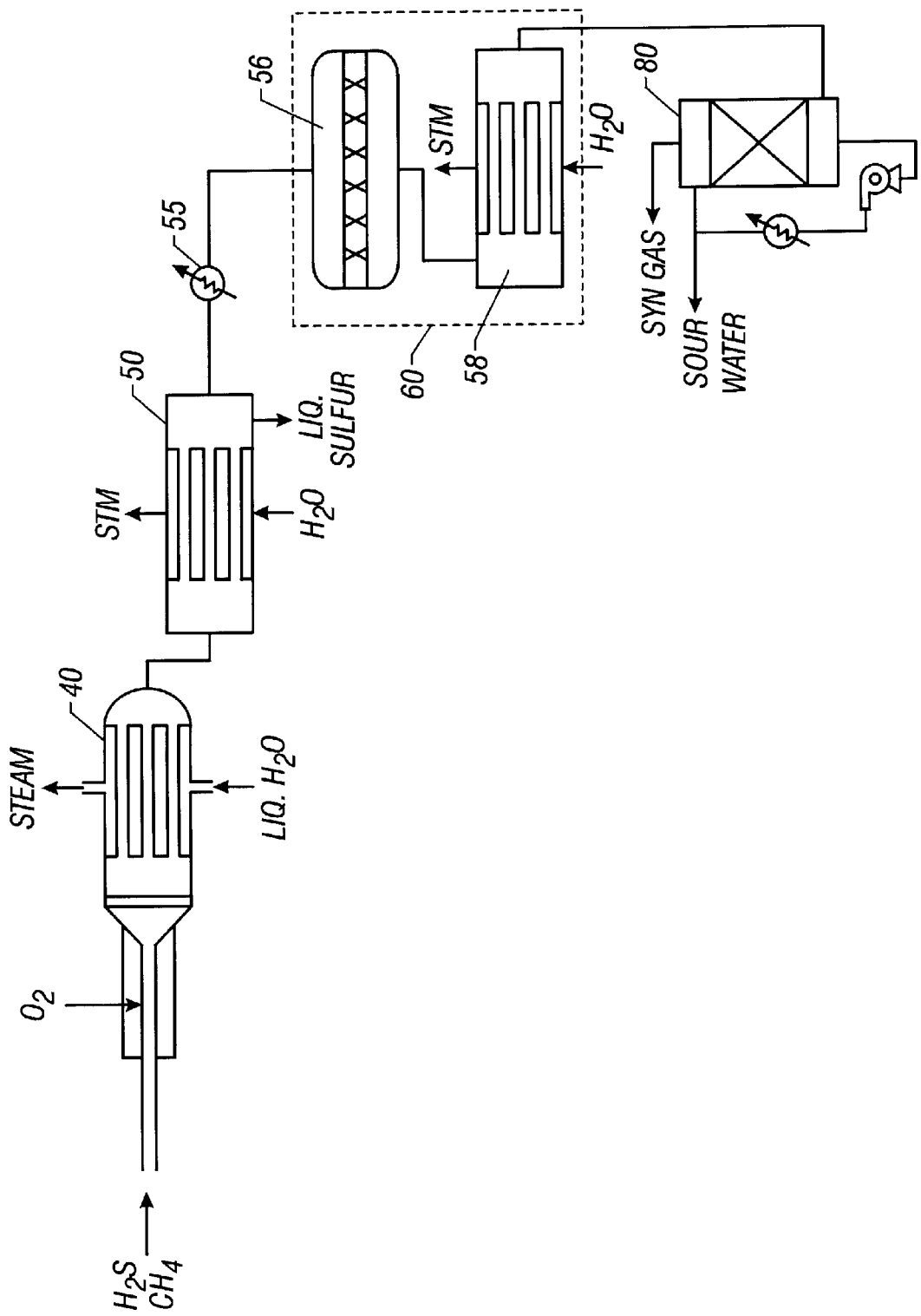
FIG. 2 is a schematic diagram of the components of one preferred embodiment of a syngas-elemental sulfur production system including the reactor of FIG. 1.

Continuing with reference to FIG. 1. the reactor 10 contains a catalyst device 24 positioned in the flow path of the feed gas mixture. The reactor also includes, adjacent reaction zone 20, a cooling zone 30 that includes ceramic ferrules 32 embedded in refractory material 26, and a tube sheet 34 containing a plurality of thermally conductive tubes 36. Tubes 36 of cooling zone 30 extend from the process (reacted) gas outlet of reactor 10 through a heat exchanger 40, such as a waste heat or firetube boiler, as also illustrated in FIG. 2, for cooling the reacted gases. Tube sheet 34 is a divider between the process gas and the boiling water where the hot process gas exits the reactor and enters boiler 40. The tubes 36 and tube sheet 34 are preferably made of carbon steel. The tube sheet forces the process gas to exit the reactor by going through the inside of tubes 36. Boiling water, contained by the shell of the heal exchanger surrounds the outside of tubes 36. Since the carbon steel of the tubes and tube sheet cannot stand the high temperatures of the process gas (i.e., about 1,300° C.), temperature protection for the metal in both is needed. For tubes 36 and for most of the tube sheet 34, this protection is afforded by the boiling water. Since the boiling water remains at a constant temperature, and since the metal conducts heat so readily, the tubes and most of the tube sheet attain temperatures only slightly above the temperatures of the boiling water (i.e., about 100° C.). This is not the case for the portions of the tube sheet where tubes 36 connect at joints 38. Without thermal protection, these joints and the first part of the tube would see temperatures far exceeding the safe operating limits for the metal. The refractory covering 26 and ceramic ferrules (tube inserts) 32 provide insulation for these relatively unprotected areas of metal. Thus, only metal surfaces that are adequately exposed to the boiling water will encounter the hot gases.

Referring now to FIG. 2, following boiler 40 is a sulfur condenser 50 for further cooling the process gas and providing for the removal of liquid sulfur product. In processes in which the cooled syngas mixture that emerges from condenser 50 still contains an undesirable amount of unreacted $H_2S$ or other sulfur-containing gas, the assembly tray further include a heater 55 and at least one tailgas cleanup unit 60. Tailgas cleanup unit 60 includes a sulfur absorbing material 56 and another condenser 58. The sulfur absorbing material is preferably zinc or iron oxide. Additionally, a conventional quench tower may follow in line after the final tailgas cleanup unit if it is desired to remove the water from the gas exiting the CPOX/SPOX reactor.

Referring again to FIG. 1, the catalyst device 24 is preferably in the form of a layer or layers of wire gauze 25, or a porous ceramic monolith (not shown), that may also support one or more catalytic components. The catalyst device is configured so that only a first fraction of the feed gas mixture contacts the catalytically active surfaces of the catalyst device, while the balance of the reactant gas mixture serves to quickly cool the first fraction and prevent the oxidation reaction from proceeding too far. Preferably the catalyst bed or device 24 is held between two porous refractory disks 22, such as alpha-alumina, which also serve as thermal barriers. Gauze 25 is preferably one or more layers of a substantially planar, flexible woven metal-containing or metal-coated screen or gauze having about 20–120 mesh. More preferably, it is a single gauze of metal wires, or a short stack of gauzes, of diameter compatible with the diameter of the reactor. In a laboratory scale reactor, the gauzes or monoliths are preferably about 25 micrometers to about 2.5 millimeters in diameter. Some preferred catalysts are gauzes made of about 87–93% by weight (wt-%) Pt and about 7–13 wt-% Rh.

Suitable catalytic components that can be included in the metal of the gauze, incorporated at its surface, or supported on a suitable refractory support include platinum, rhodium, iridium, nickel, palladium, iron, cobalt, rhenium, rubidium, Pd—$La_2O_3$, Pt/$ZrO_2$ and Pt/$Al_2O_3$. Some of the preferred catalysts also contain a lanthanide. Especially preferred catalysts are rhodium and samarium on an alumina or PSZ monolith. Those catalysts are prepared by depositing Rh (e.g., about 4–6 wt %) onto a layer of Sm (e.g., about 5 wt %) that coats a PSZ monolith. PSZ monoliths are commercially available from Vesuvius Hi-Tech Ceramics Inc., Alfred Station, N.Y. Other alternative catalyst structures, or devices, include a disk with multiple perforations formed therethrough, a honeycomb-like structure, an etched foil and any other structure that provides the desired amount of transparency to permit the required 10 millisecond or less contact time to effect the desired partial oxidation reactions. A detailed discussion of catalyst structure and composition can be found in U.S. Pat. No. 5,654,491 to Goetsch et al., which is incorporated herein.

Process for Producing Synthesis Gas

Referring again to FIG. 1, in operation, a stream of light hydrocarbon, such as methane, is fed into feed injection opening 12. A stream of $H_2S$ is fed into a second feed injection opening 14. Air or oxygen is fed into the third feed injection opening 16, which is preferably positioned close to catalyst 24. It should be understood that the feed injection openings can be configured differently from the configuration shown in FIG. 1 without affecting the principles or operation of the present system. For example, $O_2$ injection opening 16 could be placed such that the oxygen is mixed with the light hydrocarbon during the contacting of the feed gas stream with a hot catalyst. Such a configuration may help reduce the occurrence of unwanted side reactions that might otherwise rapidly occur during or after mixing of $O_2$ with the $H_2S$ and hydrocarbon components but prior to contacting the catalytic surfaces of the reaction zone.

As another alternative, the hydrocarbon feed stream may initially include an amount of $H_2S$. For example, a feed obtained directly from a natural gas reservoir may contain a small amount or even 3–25 vol. % hydrogen sulfide. In this case the separate $H_2S$ feed stream is either omitted entirely or the amount of $H_2S$ added from an external source via injection opening 14 is regulated so as to maintain a favorable molar ratio of $H_2S$ to $CH_4$, as discussed in more detail below. In either alternative, pure oxygen, via inlet 16, is preferably mixed with the hydrocarbon-$H_2S$ gas feed immediately before contacting the feed gases with a catalyst. Air, or a mixture of air and oxygen can be substituted for the pure oxygen. However, since the presence of $N_2$ in the reactant gas mixture can be problematic (i.e., forming unwanted nitrogen-containing compounds), it is usually preferable to use pure oxygen instead of air.

As the feed gases from feed injection openings 12, 16 and, optionally, 14 flow toward catalytic device 24, they are subjected to thorough mixing by static mixer 18, which can be simply a series of vanes that extend into the flow path of the reactant gas mixture. During mixing, the feed gases are shielded by radiation barrier 22 from radiant heat that is generated downstream in the process. It is preferred that the temperature on the upstream side of barrier 22 be in the range of about 20° C. to about 300° C., and no more than about 500° C. Preheating the feed gases above about 300° C. is generally not desirable because excessive heat can cause unwanted homogeneous reactions to occur that reduce the selectivity of the process for the desired CO, $H_2$, elemental sulfur and water products. It has been observed in the present studies that feed gas temperatures up to about 300° C. tend to help initiate the CPOX and SPOX reactions. It is highly preferred that there be a minimum of void or dead spaces in the areas of the reactor that are occupied by the mixing reactant gas in order to minimize the opportunity for gas stagnation and undesirable combustion reactions to occur before the reactant gas stream comes into contact with hot catalyst.

After the gases pass barrier 22, they flow past catalytic device 24 and are simultaneously heated to more than 500° C., preferably about 850–1,500° C. The gas flow rate is preferably maintained such that the contact time for the portion of the gas that contacts the catalyst is no more than about 10 milliseconds and more preferably from about 1 to 5 milliseconds. This degree of contact produces a favorable balance between competing reactions and produces sufficient heat to maintain the catalyst at the desired temperature. Elemental sulfur is produced by catalyzed partial oxidation (SPOX) according to equation (3):

$$H_2S + \tfrac{1}{2}O_2 \rightarrow 1/x\ S_x + H_2O \tag{3}$$

where x equals 2, 6, or 8, with x=2 being the most likely. At the same time exposure to the hot catalyst and oxygen partially oxidizes the hydrocarbons in the feed according to the CPOX reaction:

$$CH_4 + \tfrac{1}{2}O_2 \rightarrow CO + 2H_2 \tag{1}$$

Both reactions are catalyzed in the same reaction zone, preferably on the same catalyst device.

Regardless of whether $H_2S$ is added to the light hydrocarbon via a separate stream, or whether all or part of the $H_2S$ is included in the light hydrocarbon feed stream, it is preferred to keep the stoichiometric molar ratio of $H_2S:CH_4$ in the feed gas mixture at about 1:10 to 2:3, and it is preferred to keep the stoichiometric molar ratio of $CH_4:O_2$ at about 1.5:1 to 2.2:1, to favor the concurrent CPOX and SPOX reactions. This is best accomplished by monitoring and adjusting the composition of the feed gases during operation, temperature, and flow rates, as further described below. By establishing and maintaining reaction conditions favoring SPOX over the hydrocarbon combustion reaction of equation (2), the conversion of the carbon atoms contained in the hydrocarbon molecules to $CO_2$ is preferably restricted to less than 10 vol. %. In this way the $CO_2$ content of the product gases is minimized and the selectivity for CO and $H_2$ products is enhanced compared to what is usually obtainable with conventional CPOX syngas generation processes.

In many cases it is helpful to heat the catalytic device 24 using external means at least at the start of the process, so as to initiate the exothermic reactions on the catalyst structure. Once the system is running, it is preferably run adiabatically or nearly adiabatically (i.e., without loss of heat), so as to reduce the formation of carbon (e.g., coke) on the surface of the gauze catalyst. Preferably the catalyst structure is heated sufficiently as a result of the exothermic chemical reactions occurring at its surface to perpetuate the CPOX and SPOX reactions under favorable conditions of reactant gas molar ratios and catalyst contact time. Heating by external means can allow for increases in the rate at which feed gas can be passed through the catalyst structure while still obtaining desirable reaction products.

The rate of feed of $H_2S$ into the system is controlled and adjusted so that the heat generated by the oxidation of the $H_2S$ is sufficient to maintain the desired temperature in reaction zone 20 and thus reduce the amount of the light hydrocarbon that is completely combusted. Hence, the mole ratio of $H_2S$ to light hydrocarbon in the feed is preferably in the range of from about 1:10 to about 2:3. Where the light hydrocarbon is methane, a preferred ratio of $H_2S$ to methane is 2:3.

The superficial contact time of the feed gas stream with a preferred embodiment of gauze catalytic device 24 is less than about 10 milliseconds, and typically within a range of about 1–10 milliseconds. When used in the present invention, it is preferred that the superficial contact time of the feed gas stream with the catalyst be less than about 5 milliseconds, more preferably less than about 2 milliseconds. Superficial contact time is inversely proportional to the term "space velocity" that is used in many chemical process descriptions. Although for ease in comparison with published space velocity values of others, space velocities at standard conditions are used to describe the present studies, it is well recognized in the art that residence time is the inverse of space velocity and that the disclosure of high space velocities equates to low residence times.

Referring now to FIG. 2, from reaction zone 20, the reacted gases are rapidly cooled in cooling zone 30, preferably entering a heat exchanger such as firetube boiler 40, where they are cooled to below 450° C., and preferably to below 340° C. As it is preferred that heat removed from the partially oxidized gases can be recaptured in steam heating or the like. The rapid cooling that occurs in the boiler drops the temperature of the reacted gases to below about 450° C. and thus ceases the CPOX and SPOX reactions.

The cooled, partially oxidized gases flow from boiler 40 into condenser 50, where they are cooled further until the dew point of the elemental sulfur is reached. This allows for the removal of elemental sulfur, as desired, from the process. Once the bulk of the elemental sulfur is removed, the partially oxidized gases are reheated in heater 55 and passed through a tailgas converter unit 60. More specifically, in each converter unit 60, the hot gas stream is passed over a bed of sulfur absorbing material such as zinc or iron oxide. In this bed, any elemental sulfur is converted to metal sulfide and retained in the bed. The effluent from the sulfur absorber is then preferably cooled sufficiently to condense the bulk of any remaining water from the gas stream. The synthesis gas, which is substantially free of sulfur-containing gases, is recovered and may be fed directly into another process such as a methanol generation plant or a Fischer-Tropsch operation.

While a preferred embodiment of the present invention has been shown and described, it will be understood that variations can be to the preferred embodiment, without departing from the scope of the present invention. For example, the mixing process can be altered or replaced with an active mixer, the thermal barrier can be modified, the structure and composition of the catalyst can be varied, and the tail gas treatment steps can be modified. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The disclosure of U.S. application Ser. No. 09/625,710, and the disclosures of all patents and publications identified above are incorporated herein by reference.

What is claimed is:

1. A process for producing synthesis gas comprising:
   contacting an $H_2S$-containing light hydrocarbon stream, in the presence of $O_2$, with a catalyst having activity for catalyzing the partial oxidation of said hydrocarbon to a product comprising CO and $H_2$ and also having activity for catalyzing the partial oxidation of $H_2S$ to elemental sulfur and water, such that the catalytic partial oxidation of said light hydrocarbon and the catalytic partial oxidation of said $H_2S$ occur and a process gas stream is obtained comprising CO, $H_2$, gaseous elemental sulfur and steam; and
   condensing elemental sulfur from said process gas stream to provide a substantially desulfurized synthesis gas stream.

2. The process of claim 1 comprising contacting said catalyst with a portion of said $H_2S$-containing light hydrocarbon stream for no more than about 10 milliseconds.

3. The method according to claim 1 wherein said $H_2S$-containing light hydrocarbon stream has a $H_2S$:light hydrocarbon molar ratio of about 1:10 to about 2:3.

4. The method according to claim 3 wherein said light hydrocarbon comprises $CH_4$.

5. A process for producing synthesis gas comprising:
providing an $H_2S$-containing hydrocarbon feed gas stream containing a $C_1$–$C_4$ alkane, or mixture thereof, said feed stream having a $H_2S$:$CH_4$ molar ratio of about 1:10 to about 2:3;
mixing said $H_2S$-containing hydrocarbon feed gas stream with an $O_2$-containing stream to form a reactant gas stream, said reactant gas stream having a $CH_4$:$O_2$ molar ratio of about 1.5:1 to about 2.2:1;
passing said reactant gas stream over a catalyst such that a portion of said reactant gas contacts said catalyst for no more than about 10 milliseconds, said catalyst being capable of catalyzing the partial oxidation of said $C_1$–$C_4$ alkane, or mixture thereof, to CO and $H_2$ and also capable of catalyzing the partial oxidation of $H_2S$ to elemental sulfur and water such that a gaseous product stream comprising CO, $H_2$, $1/x\ S_x$ and $H_2O$ is obtained, wherein x=2, 6 or 8;
cooling said gaseous product stream to the condensation temperature of elemental sulfur, or lower, such that elemental sulfur condenses from said product stream and an at least partially desulfurized gaseous product stream is obtained;
optionally, recovering elemental sulfur product;
optionally, removing a residual gaseous sulfur-containing component from said at least partially desulfurized gaseous product stream; and
recovering synthesis gas from said product stream.

6. A method for producing syngas comprising providing a first gas stream containing a light hydrocarbon, mixing a second gas stream containing $H_2S$ with the first gas stream to form a feed gas stream, mixing the feed gas stream with an oxygen containing stream to form a mixed feed stream, contacting the mixed feed stream with a catalyst to form a product stream comprising syngas and elemental sulfur, and removing syngas and elemental sulfur from the product stream.

7. The method according to claim 6 further comprising removing residual $H_2S$ from the product stream.

8. The method according to claim 6 wherein mixing a second gas stream comprising $H_2S$ with the first gas stream to form a feed gas stream is carried out at temperatures up to about 300° C.

9. The method according to claim 6 wherein contacting the feed gas stream with a catalyst to form a product stream is carried our at temperatures ranging from about 850 to about 1,500° C.

10. The method according to claim 6 wherein less than 10% of the carbon atoms in the light hydrocarbon molecules are converted to carbon dioxide.

11. The method according to claim 6 wherein the catalyst contact time is less than 10 milliseconds.

12. The method according to claim 6 wherein the catalyst is selected from the group consisting of: platinum, rhodium, iridium, nickel, palladium, iron, cobalt, rhenium, rubidium, Pd—$La_2O_3$, Pt/$ZrO_2$, Pt/$Al_2O_3$ and combinations thereof.

13. A method for producing syngas comprising providing a first gas stream comprising a light hydrocarbon, mixing a second gas stream comprising $H_2S$ with the first gas stream to form a feed gas strewn, while maintaining said feed gas stream below 500° C., contacting the feed gas stream with a catalyst at a temperature in the range of about 500° C.–1,500° C., in the presence of $O_2$, to form a product stream comprising syngas and elemental sulfur wherein less than 10% of the carbon atoms in the light hydrocarbon molecules are convened to carbon dioxide, and removing syngas and elemental sulfur from the product stream.

14. The method according to claim 13 comprising mixing $O_2$ with the light hydrocarbon prior to contacting the feed gas stream with said catalyst.

15. The method according to claim 13 comprising mixing $O_2$ with the light hydrocarbon during the contacting of the feed gas stream with said catalyst.

16. A method for producing syngas comprising contacting a feed stream with a partial oxidation catalyst, such that CO, $H_2$, and elemental sulfur are produced, said feed stream comprising a light hydrocarbon, $H_2S$, and $O_2$ in a molar ratio of $H_2S$:light hydrocarbon of about 1:10 to about 2:3.

17. The method according to claim 16 wherein said feed stream comprises $CH_4$ and $H_2S$ in a molar ratio of $H_2S$:$CH_4$ of about 1:10 to about 2:3.

18. The method according to claim 16 wherein said partial oxidation catalyst comprises rhodium on a refractory support.

19. The method according to claim 18 wherein said partial oxidation catalyst further comprises samarium on said refractory support.

20. The method according to claim 16 wherein said feed stream comprises a mixture comprising natural gas and an $H_2S$-containing stream.

* * * * *

UNITED STATES PATENT AND TRADEMARK OFFICE
CERTIFICATE OF CORRECTION

PATENT NO.   : 6,579,510 B2
DATED        : June 17, 2003
INVENTOR(S)  : Alfred E. Keller It is certified that error appears in the above-identified patent and that said Letters Patent is hereby corrected as shown below:

Column 4,
Line 15, after "of" delete "to".
Line 30, after "absorbing" delete "sulfur absorbing".
Line 58, after "catalyst" delete "is".

Column 12,
Line 19, after "gas" delete "strewn".
Line 19, after "gas" insert -- stream --.
Line 25, after "are" delete "convened".
Line 25, after "are" insert -- converted --.

Signed and Sealed this

Seventh Day of September, 2004

JON W. DUDAS
*Director of the United States Patent and Trademark Office*